UNITED STATES PATENT OFFICE.

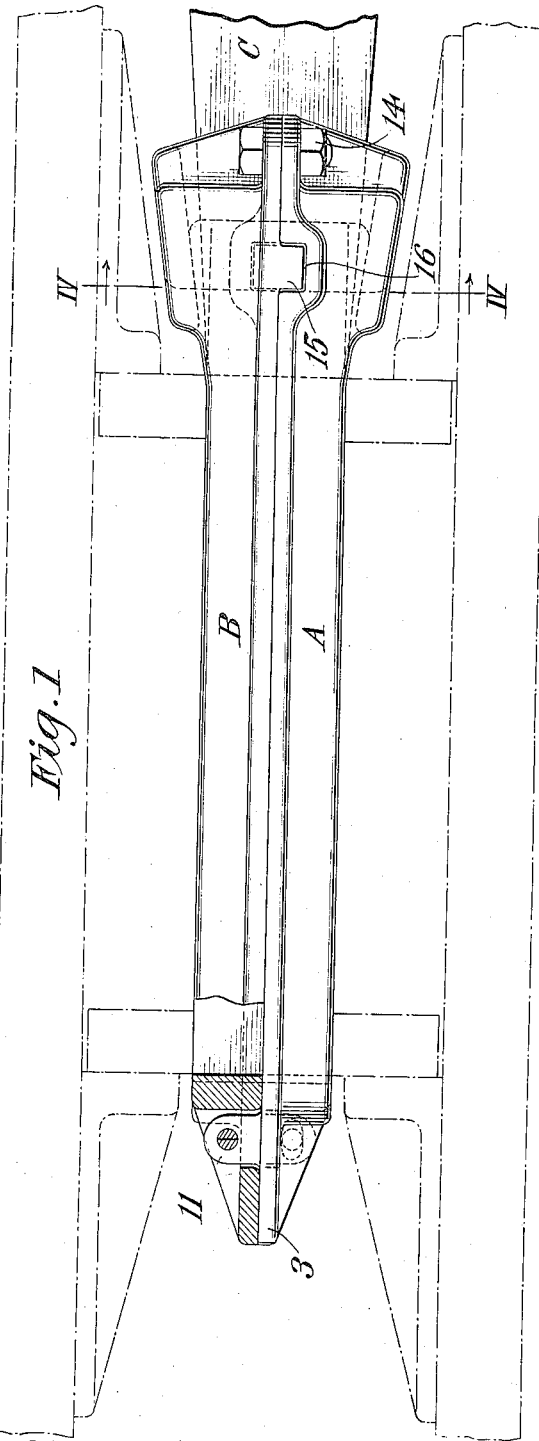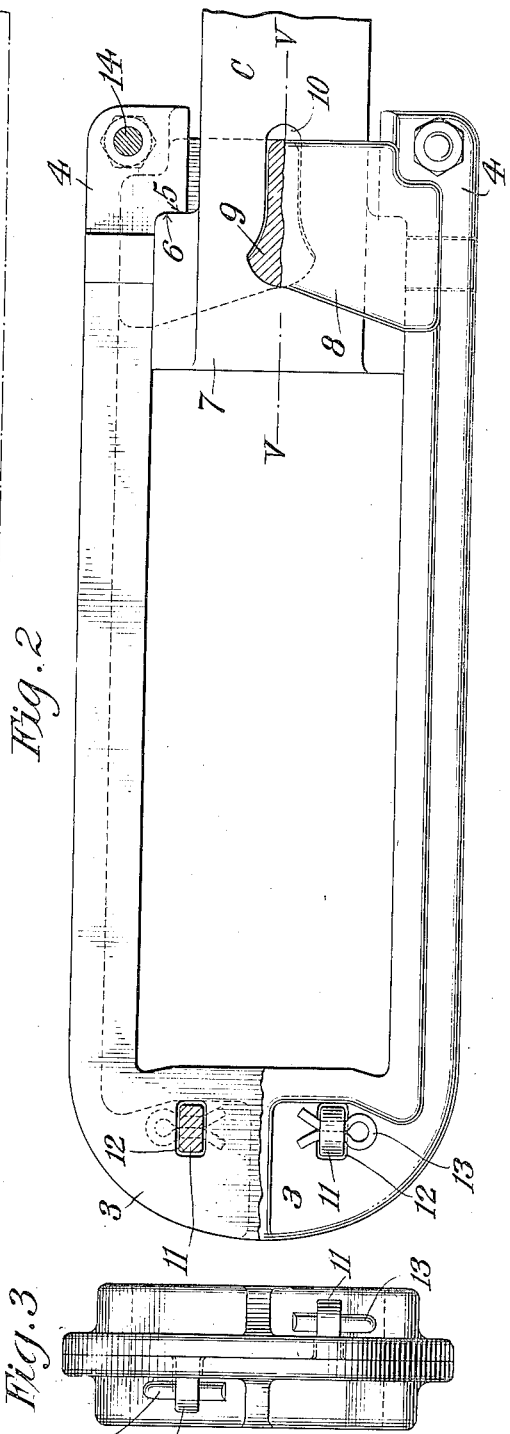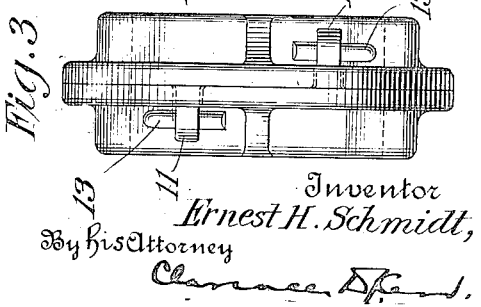

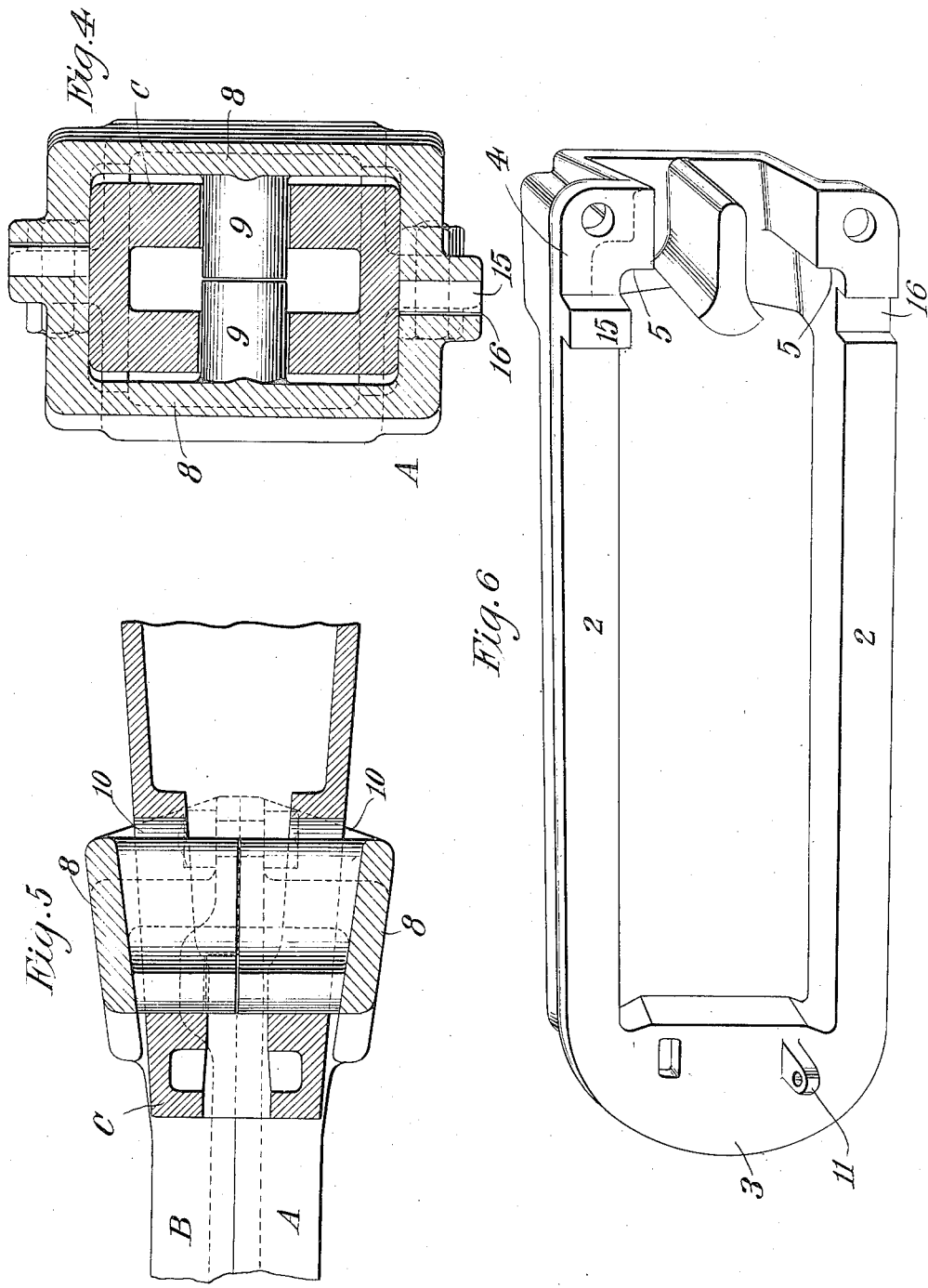

ERNEST H. SCHMIDT, OF CLEVELAND, OHIO, ASSIGNOR TO THE NATIONAL MALLEABLE CASTINGS COMPANY, OF CLEVELAND, OHIO, A CORPORATION OF OHIO.

COUPLING-YOKE.

1,208,669. Specification of Letters Patent. Patented Dec. 12, 1916.

Application filed February 25, 1914. Serial No. 820,795.

*To all whom it may concern:*

Be it known that I, ERNEST H. SCHMIDT, a citizen of the United States, residing at Cleveland, Cuyahoga county, Ohio, have invented new and useful Improvements in Coupling-Yokes, of which the following is a specification, reference being had to the accompanying drawings, in which—

Figure 1 is a plan of my improved yoke showing its application to a car coupler; Fig. 2 is a side elevation thereof, partly in section; Fig. 3 is a rear elevation thereof; Fig. 4 is a section on lines IV—IV of Fig. 1; Fig. 5 is a section on lines V—V of Fig. 2; and Fig. 6 is a perspective of one of the parts of the yoke.

My invention relates to coupler yokes and consists in a yoke comprised of two symmetrically shaped parts adapted to interlock with each other and to be suitably secured together, and in the construction of the parts which I shall hereinafter describe and claim.

Referring to the drawings A and B indicate the two halves of the yoke and C the coupler. Each part A and B of the yoke has in itself the yoke in complete outline, and is comprised of the top and bottom horizontally extending arms 2, the rear vertical portion 3 and the strengthening rib 4, extending around the exterior of the arms 2 and the rear portion 3 as a reinforcement therefor. Each arm 2 terminates at its forward end in an inwardly extending lip 5, which bears against the front edges 6 of the coupler liner block 7, and each half, or part, is also provided with a side plate 8, connecting and reinforcing the forward ends of the arms 2. Integral with each side plate 8 is a key member 9, intended to extend part way through a horizontal slot 10, in the coupler shank and liner block. The key member 9 may be of any desired shape, but I prefer that at its rear side it shall have a wide bearing struck on an arc, thereby providing a large area for taking up the pulling stresses against the rear side of the slot 10 in the coupler shank.

The two parts of the yoke are secured together as follows: The rear end 3 of each part A and B has a tongue 11, and an aperture 12, each tongue 11 entering the corresponding aperture 12 which lies opposite it upon the other part when the two parts are brought together. When the parts A and B have been interengaged in this manner the tongues 11 are secured in the apertures 12 by any suitable means, such as the cotter pins 13. The halves A and B are also secured together at their forward ends by means of the bolts 14, which are inserted into the registering bolt holes in the forward ends of the ribs 4. I also preferably provide an interlocking engagement between the two parts of the yoke, which consists in a projection and recess engagement between the inner vertical faces of the two parts A and B near their forward ends, each part having a projection 15 and a recess 16, each projection 15 being adapted to fit snugly into the corresponding recess 16 in the opposing part of the yoke, so that both parts of the yoke, by reason of this interlocking engagement will act as a unit in solidly resisting any buffing or pulling strains which may be thrown more on one part of the yoke than on the other part.

The side plates 8 of each part are preferably flared outwardly, as is shown in Fig. 1, to provide clearance between the vertical side faces of the liner block and the inner vertical faces of the plates to permit a limited amount of angular movement of the coupler relative to the yoke without throwing strains upon the side plates.

In assembling the yoke and the coupler a half (for instance the half A) of the yoke is placed in position with its forward end inclosing a side and parts of the top and bottom of the liner block and with its lips 5 engaging the vertical forward faces 6 of the liner block, and with the key member 9 seated in the slot 10. The other half B of the yoke is then applied to the opposite side of the liner block so that its lips 5 will engage the vertical forward faces 6 of the liner block, its key member 9 will seat in the opposite side of the slot 10, its tongue 11 and projection 15 will engage the corresponding aperture 12 and the recess 16 respectively of the part A, and its aperture 12 and recess 16 will likewise be engaged respectively by the tongue 11 and projection 15 of the part A. The two halves may then be secured together by inserting into the tongues 11 the cotter pins 13 at the rear ends of the yoke halves, and at their forward ends by the bolts 14. The yoke and the coupler are then ready, when the draft rigging has been inserted, for application to a car.

The form of yoke which I have shown and described herein is of very simple, compact form, and provides a very strong and durable device. It is obvious that various modifications may be made therein, without departing from my invention.

What I claim is:

1. A coupler yoke formed in two parts by means of a longitudinal vertical division, each part engaging forward faces of a coupler liner-block, and each part having on its inner face a laterally-extending projection seating by a direct lateral movement in a corresponding recess in the other part, whereby the excessive stresses of buffing and draft applied to one part will be equalized between the parts, and means for securing the parts together.

2. A coupler yoke comprised of two parts separated by a longitudinal vertical division, each part engaging forward faces of a coupler liner block, the said two parts having interlocking engagements with each other near their forward ends to equalize the stresses of buffing and draft applied to the parts, and means for securing the parts together.

3. A coupler yoke comprised of two parts, each part being of substantially U-shape and engaging forward faces of a coupler liner block, and means for preventing longitudinal movement of one part relative to the other part, said means consisting of projections on each part coöperating with recesses on the other part.

ERNEST H. SCHMIDT.

Witnesses:
HARRY E. ORR,
B. S. BARSTOW.